WILLIAM HARTLEY MILLER.
Improvement in Piston Rod Packing.
No. 4,587. Reissued Oct. 10, 1871.
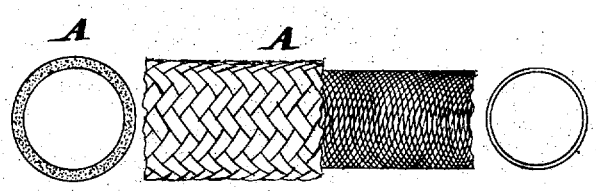
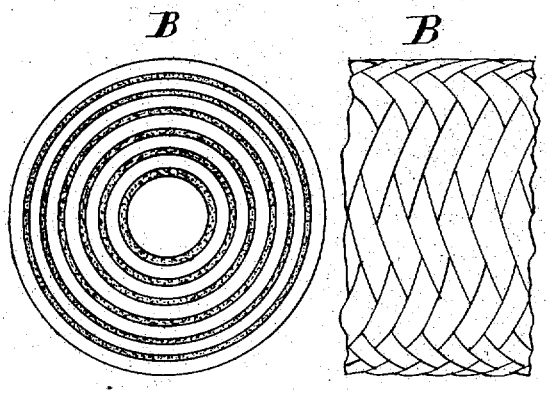
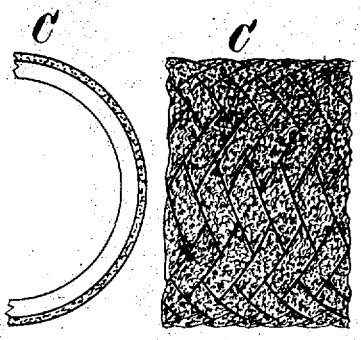
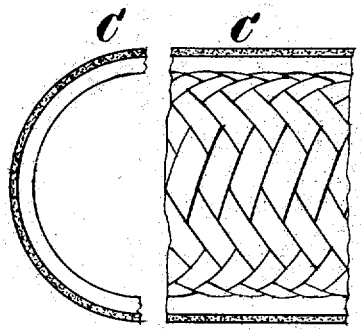
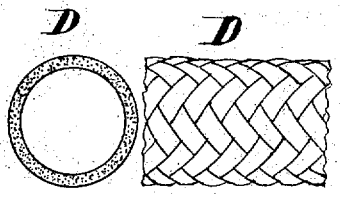
Witnesses
John A. Bickel
Wm R. Wright
Inventor
W. Hartley Miller

UNITED STATES PATENT OFFICE.

WILLIAM HARTLEY MILLER, OF PHILADELPHIA, PENNSYLVANIA.

IMPROVEMENT IN PISTON-ROD PACKINGS.

Specification forming part of Letters Patent No. 73,454, dated January 21, 1868; reissue No. 4,587, dated October 10, 1871.

*To all whom it may concern:*

Be it known that I, WILLIAM HARTLEY MILLER, of the city of Philadelphia, State of Pennsylvania, have invented a new article of manufacture for the stuffing-boxes of engines and other machinery, and for other joints of the same, including pipe and steam-chest joints, &c.; and I do hereby declare that the following is a full, clear, and exact description thereof, reference being had to the accompanying drawing and to the letters of reference marked thereon, making part of this specification.

The nature of said invention consists in the manufacture of fibrous or metallic (or a combination of fibrous and metallic) tubes, layers, or plies, placing one within the other, or interweaving, interbraiding them, &c., with a layer of lubricant between, to form a pliable, elastic, and durable packing of the required size, form, and quality.

To enable others skilled in the art to make and use my invention, I will proceed to describe its construction and operation.

I make a metallic or fibrous tube, or metallic and fibrous tube, or any required number of tubes to make a given diameter, as at B, in which seven tubes make a diameter of two and a quarter inches. By varying the thickness of the tubes, unequal diameters will be made with an equal number of tubes, one within or upon another. By adding successive layers, or by braiding or weaving successive tubes, any required diameter can be attained; and where these tubes are laid one upon the other in the course of manufacture, the tension upon the thread has a tendency to compress the inner tube until the combined tubes or layers have the appearance of a rope or cord, as at B. This packing-tube or cord is used as ordinary packing is applied to stuffing-boxes or other joints. A represents a longitudinal view of my improved packing, composed of metallic and fibrous material, interlaid with suitable lubricant. Another combination of fibrous and metallic tube consists of the tube being composed of fibrous threads in connection with metallic threads woven together. B represents a piece of my improved packing, and shows its construction to consist of successive layers, plies, or tubes of fibrous material interlaid with lubricating substances, which interlaying serves to distribute the lubricant well throughout the packing, as well on the inner braids as on the outer, so that when one layer of braid is worn off, a new one fully lubricated is presented to the rod. The lubricant used may be dry powdered soap-stone, blacklead, oil, wax, or paraffine, or their equivalents, or a combination of any two or more of these, the lubricant shown being a combination of paraffine and dry powdered soap-stone. It is possible to apply the paraffine, oil, &c., by saturation after the packing is complete, but the powdered soap-stone, black-lead, &c., not being capable of introduction by saturation, must be applied in the course of construction substantially as shown, in order to be incorporated with the body of the packing. D represents a longitudinal view of a piece of my improved packing tube, consisting of a single fibrous braid. This braid may be made of various thicknesses, and may be saturated with suitable lubricants, which is another way of introducing the lubricant into the body of the packing, whether it is composed of a single braid or of more, but is not so effectual as interlaying it.

Other letters of reference indicate corresponding views of my improved packing.

These tubes are most conveniently made on a braiding-machine, and tube after tube can be applied by repassing them through the machine. Other methods of manufacture will produce similar tubes for the purpose.

I use suitable lubricants by saturation, or as shown at B and C.

I do not limit myself to the use of any particular kind of metallic or fibrous material, or lubricant in common use.

What I claim as my invention, and desire to secure by Letters Patent, is—

1. In a fibrous packing, composed of a series of concentric braids, applying or introducing the lubricant during the course of construction, in distinction to saturating it after all the braid has been applied.

2. As a new article of manufacture, a piston-packing, composed of a series of concentric layers of fibrous material with suitable lubricants interposed or laid on each braid before the succeeding braid is woven or braided thereon, substantially as described.

WM. HARTLEY MILLER.

Witnesses:

WM. R. WRIGHT,
JOHN A. BICKEL.

(151)